(12) United States Patent
Patierno et al.

(10) Patent No.: US 9,640,219 B1
(45) Date of Patent: May 2, 2017

(54) SYSTEMS AND METHODS FOR MODIFYING A SEGMENT OF AN UPLOADED MEDIA FILE

(71) Applicant: Google Inc., Mountain View, CA (US)

(72) Inventors: David Matthew Patierno, San Francisco, CA (US); Reed Morse, Palo Alto, CA (US); Jason Toff, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/634,250

(22) Filed: Feb. 27, 2015

Related U.S. Application Data

(60) Provisional application No. 61/972,820, filed on Mar. 31, 2014.

(51) Int. Cl.
*H04N 5/93* (2006.01)
*G11B 27/032* (2006.01)
*G11B 27/10* (2006.01)

(52) U.S. Cl.
CPC .......... *G11B 27/032* (2013.01); *G11B 27/102* (2013.01)

(58) Field of Classification Search
CPC .............. H04N 21/4725; G11B 27/031; H04L 67/1097; H04L 67/1095
USPC ........................................................ 386/278
See application file for complete search history.

(56) References Cited

U.S. PATENT DOCUMENTS

| | | | | |
|---|---|---|---|---|
| 6,735,311 B1 * | 5/2004 | Rump | ................ | H04L 63/0428 348/E7.056 |
| 6,819,394 B1 * | 11/2004 | Nomura | ............... | G11B 27/034 352/38 |
| 7,814,416 B2 * | 10/2010 | Shinkai | ............... | G11B 27/034 715/200 |
| 8,214,655 B2 * | 7/2012 | Sato | ........................ | H04N 5/783 380/269 |
| 8,742,792 B2 * | 6/2014 | McCoy | ............... | H03K 3/0375 326/27 |
| 8,817,885 B2 * | 8/2014 | Yoon | ..................... | H04N 19/159 375/240.01 |
| 9,143,542 B1 * | 9/2015 | Tseytlin | ................ | H04L 65/403 |
| 2007/0130007 A1 * | 6/2007 | Haberman | ........ | G06F 17/30038 705/300 |
| 2008/0301380 A1 * | 12/2008 | Itho | ....................... | G11B 27/034 711/154 |
| 2011/0161802 A1 * | 6/2011 | Jia | ........................... | G06F 17/24 715/235 |
| 2012/0084825 A1 * | 4/2012 | Sharma | ............. | H04N 21/4351 725/109 |
| 2015/0089019 A1 * | 3/2015 | Chou | ................ | G06F 17/30174 709/217 |

* cited by examiner

*Primary Examiner* — Helen Shibru
(74) *Attorney, Agent, or Firm* — Byrne Poh LLP

(57) ABSTRACT

Systems and techniques for modifying a subsection of uploaded media are presented. An instruction component receives a media file and a media enhancement instruction that includes enhancement data and media interval data for a first segment of the media file. A processing component modifies the first segment of the media file associated with the media interval data based on the enhancement data to generate an edited first segment of the media file. A finalization component generates an edited version of the media file that includes the edited first segment of the media file and at least a second segment of the media file that is not modified based on the enhancement data.

20 Claims, 14 Drawing Sheets

SYSTEMS AND METHODS FOR MODIFYING A SEGMENT OF AN UPLOADED MEDIA FILE

CROSS REFERENCE TO RELATED APPLICATIONS

This application claims priority to U.S. Provisional Application No. 61/972,820, filed Mar. 31, 2014, and entitled "SYSTEMS AND METHODS FOR MODIFYING A SEGMENT OF AN UPLOADED MEDIA FILE", the entirety of which is incorporated herein by reference.

TECHNICAL FIELD

This disclosure relates generally to modifying media content, and more specifically, to modifying a subsection of uploaded media content.

BACKGROUND

The internet and media enabled portable computing devices have dramatically altered the processes for generating and consuming media content. Additionally, the convenience of being able to upload, view and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. However, in general, conventional media servers for online media services are merely repositories for the uploaded user-generated content. As such, in general, conventional media servers for online media services simply allow users to upload, view and/or share media content.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an instruction component, a processing component and a finalization component. The instruction component receives a media file and a media enhancement instruction that includes enhancement data and media interval data for a first segment of the media file. The processing component modifies the first segment of the media file associated with the media interval data based on the enhancement data to generate an edited first segment of the media file. The finalization component generates an edited version of the media file that includes the edited first segment of the media file and at least a second segment of the media file that is not modified based on the enhancement data.

Additionally, a non-limiting implementation provides for receiving a single payload including a media file and a media enhancement request that includes enhancement data and media interval data for a first segment of the media file, editing the first segment of the media file associated with the media interval data based on the enhancement data to generate an edited first segment of the media file, and generating an edited version of the media file that includes the edited first segment of the media file and at least a second segment of the media file that is not modified based on the enhancement data.

In accordance with another implementation, a system includes a device and at least one server. The device generates a single data transmission that includes a media file, enhancement data for a first segment of the media file, and media interval data for the first segment of the media file. The at least one server receives the single data transmission generated by the device, edits the first segment of the media file associated with the media interval data based on the enhancement data to generate an edited first segment of the media file, and generates an edited version of the media file that includes the edited first segment of the media file and at least a second segment of the media file that is not modified based on the enhancement data.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
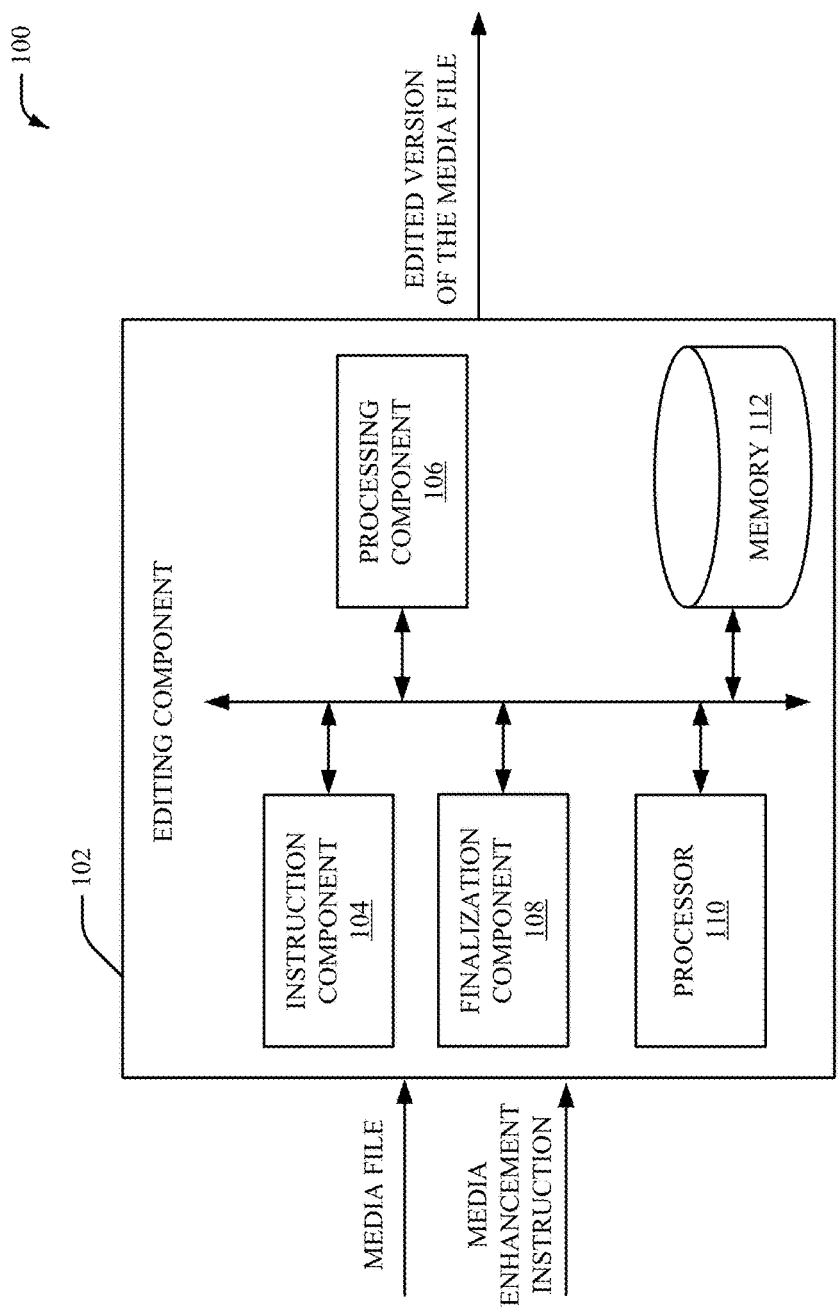
FIG. 1 illustrates a high-level block diagram of an example editing component for modifying a subsection of uploaded media content, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The internet and media enabled portable computing devices have dramatically altered the processes for generating and consuming media content. Additionally, the convenience of being able to upload, view and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. However, in general, conventional media servers for online media services are merely repositories for the uploaded user-generated content. As such, in general, conventional media servers for online media services simply allow users to upload, view and/or share media content.

To that end, techniques for modifying a subsection of uploaded media content are presented. For example, a mobile device can be employed with at least one server to apply at least one media enhancement to a specific portion of a media file. In an aspect, a mobile device can upload a media file along with a media enhancement instruction (e.g., a media enhancement request) for a specific portion the media file. For instance, a mobile device can upload a media file along with a media enhancement instruction to at least one server. A media enhancement instruction (e.g., a media enhancement request) can include enhancement data (e.g., a video effect, a video filter, an audio effect, etc.) and/or media interval data (e.g., a start frame and an end frame of a specific portion of a media file, a start time and an end time for a specific portion of a media file, etc.). The at least one server can identify a specific portion of a media file based on the media interval data and/or modify a specific portion of a media file based on the enhancement data. Accordingly, a specific portion of a media file can be modified (e.g., a video effect, a video filter, and/or an audio effect can be applied to a specific portion of a media file) while at least another portion of the media file is not modified (e.g., a video effect, a video filter, and/or an audio effect is not applied to at least another portion of the media file). Therefore, greater level of control and/or greater flexibility for applying media effects (e.g., a video effect, a video filter, an audio effect, an audio filter, etc.) to a media file can be provided.

Referring initially to FIG. 1, there is illustrated an example system 100 that can facilitate modifying a subsection (e.g., a segment, a portion, etc.) of uploaded media content, according to an aspect of the subject disclosure. In one example, the system 100 can be implemented on or in connection with at least one server (e.g., at least one server that hosts and/or modifies user-uploaded media content). The system 100 can be employed by various systems, such as, but not limited to media editing systems, media content systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

Specifically, the system 100 can provide an editing component with an instruction feature (e.g., instruction component 104), a processing feature (e.g., processing component 106) and a finalization feature (e.g., finalization component 108) that can be utilized in and/or in connection with, for example, a media application (e.g., a media capture application, a media editor application, etc.). The instruction feature can receive a media file and a media enhancement instruction that includes enhancement data and media interval data for a first segment of the media file. The processing feature can modify the first segment of the media file associated with the media interval data based on the enhancement data to generate an edited first segment of the media file. The finalization feature can generate an edited version of the media file that includes the edited first segment of the media file and at least a second segment of the media file that is not modified based on the enhancement data.

In particular, the system 100 can include an editing component 102. In FIG. 1, the editing component 102 includes an instruction component 104, a processing component 106 and a finalization component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The editing component 102 (e.g., the instruction component 104) can receive a media file (e.g., MEDIA FILE shown in FIG. 1) and a media enhancement instruction (e.g., MEDIA ENHANCEMENT INSTRUCTION shown in FIG. 1). For example, a single data package (e.g., a single payload, a single data transmission, a single data packet, etc.) can include the media file and the media enhancement instruction. In one implementation, the media enhancement instruction can be included in the single data package before the media file (e.g., in a header of the single data package). In another implementation, the media enhancement instruction can be interspersed within the media file (e.g., within media data associated with the media file). In yet another implementation, the media enhancement instruction can be included in the single data package after the media file. In an aspect, the media file can be an uploaded media file (e.g., a media file uploaded to a media sharing platform, a media file uploaded to at least one server, etc.). For example, a user can upload the media file via a device (e.g., a media capable device, a user device, a mobile device, etc.) The media file can include video (e.g., a video file, a video clip, a video sample, etc.) and/or audio (e.g., an audio file, an audio clip, an audio sample, a music file, a music clip, a music sample, etc.). It is to be appreciated that the media file can be in any recognizable media file format (e.g., video file format and/or audio file format), codec compression format, etc.

The media enhancement instruction (e.g., a media enhancement request) can include enhancement data (e.g., media enhancement data) and/or media interval data. For example, the media enhancement instruction can include enhancement data and/or media interval data for at least a first segment of the media file (e.g., at least one segment of the media file to be modified based on the enhancement data). The enhancement data can be a media effect. For example, the enhancement data can be a video effect, a video filter, an audio effect and/or an audio filter. As such, the enhancement data can include, but is not limited to, a color enhancement, a lighting enhancement, a stabilization effect, a blurring effect (e.g., a face blurring effect), a slow motion effect, a filter effect, an audio effect, another visual effect, etc. The media interval data can be associated with a segment of the media file (e.g., a segment of the media file to be modified based on the enhancement data, the first segment, etc.). In an aspect, the media interval data can be a start time and an end time for a segment of the media file. In another aspect, the media interval data can be a first media frame (e.g., a start frame) and a last media frame (e.g., an end frame) for the segment of the media file. For example, the instruction component 104 can receive media interval data that includes an identifier for a first media frame of the first segment and/or an identifier for a last media frame of the first segment.

The processing component 106 can process the first segment (e.g., a particular segment, a subsection, etc.) of the media file based on the enhancement data and/or the media interval data. For example, the processing component 106 can modify the first segment of the media file associated with the media interval data based on the enhancement data (e.g., to generate an edited first segment of the media file). In an aspect, the processing component 106 can determine one or more media frames of the first segment based on the media interval data. Additionally or alternatively, the processing component 106 can apply one or more media enhancements associated with the enhancement data to the one or more media frames of the first segment. Furthermore, the processing component 106 can withhold from applying the one or more media enhancement to one or more other media frames (e.g., at least one other segment) not associated with the first segment of the media file. For example, the processing component 106 can maintain a visual configuration and/or an audio configuration of one or more other media frames not associated with the first segment of the media file. As such, video effects and/or audio effects can be applied to a specific portion of the media file without applying video effects and/or audio effects to at least another portion of the media file.

The finalization component 108 can generate an edited version of the media file (e.g., EDITED VERSION OF THE MEDIA FILE shown in FIG. 1). The edited version of the media file (e.g., a modified version of the media file) can include the edited first segment of the media file and at least a second segment (e.g., another segment, another subsection, etc.) of the media file that is not modified based on the enhancement data. For example, the finalization component 108 can generate an edited version of the media file where the enhancement data is only applied to a specific portion of the media file (e.g., the first segment). In an aspect, the finalization component 108 can associate the edited version of the media file with a user (e.g., a user identity) that uploaded the media file. In one example, the edited version of the media file can be media content developed directly for utilization over a network (e.g., media content developed directly for implementation on the web, streaming media content, etc.). In another example, the edited version of the media file can be stored in a content database associated with at least one server configured for generating the edited version of the media file. In another example, the edited version of the media file can be a new media file uploaded by a user (e.g., newly uploaded media content stored in a content database). In another example, the edited version of the media file can overwrite media content originally uploaded by a user (e.g., overwrite an original version of the media file stored in a content database).

In an aspect, the processing component 106 can further modify a third segment (e.g., another segment, another subsection, etc.) of the media file based on the enhancement data to generate an edited third segment. As such, the edited version of the media file can include at least an edited first segment and an edited third segment that are modified by the enhancement data, as well as a second segment (e.g., another segment, another subsection, etc.) that is not modified by the enhancement data. In another aspect, the processing component 106 can further modify a third segment of the media file based on other enhancement data to generate an edited third segment. As such, the edited version of the media file can include at least an edited first segment that is modified by the enhancement data, an edited third segment that is modified by other enhancement data, and a second segment that is not modified by the enhancement data or the other enhancement data. As such, the processing component 106 can modify one or more segments of a media file based on one or more media effects.

In a non-limiting example, a media file received by the editing component 102 (e.g., the instruction component 104) can include more than one scene. For example, a media file received by the editing component 102 (e.g., the instruction component 104) can include a first scene (e.g., a first segment) that shows a dog, a second scene (e.g., a second segment) that shows a stick, and a third scene (e.g., a third segment) that shows the dog fetching the stick. Additionally, a media enhancement instruction can be received by the editing component 102 (e.g., the instruction component 104). The media enhancement instruction received by the editing component 102 (e.g., the instruction component 104) can include enhancement data (e.g., a slow motion filter, etc.) and media interval data associated with the third scene of the media file. As such, the processing component 106 can identify one or more media frames corresponding to the third scene of the media file based on the media interval data. Additionally, the processing component 106 can apply the enhancement data (e.g., the slow motion filter, etc.) to the third scene of the media file. Accordingly, the finalization component 108 can generate an edited version of the media file where the dog fetching the stick in the third scene is in slow motion, but the first scene that shows the dog and the second scene that shows the stick is not in slow motion.

In another non-limiting example, a media file received by the editing component 102 (e.g., the instruction component 104) can include a first scene (e.g., a first segment) that shows a news anchor and a second scene (e.g., a second segment) that shows a crowd of bystanders. Additionally, a media enhancement instruction can be received by the editing component 102 (e.g., the instruction component 104). The media enhancement instruction received by the editing component 102 (e.g., the instruction component 104) can include enhancement data (e.g., a face blurring effect, etc.) and media interval data associated with the second scene of the media file. As such, the processing component 106 can identify one or more media frames corresponding to the second scene of the media file based on the media interval data. Additionally, the processing component 106 can apply the enhancement data (e.g., the face blurring effect, etc.) to the second scene of the media file. Accordingly, the finalization component 108 can generate an edited version of the media file where faces of the bystanders in the second scene are blurred, but the face of the news anchor in the first scene is not blurred. As such, a user can upload a media file that includes multiple scenes and/or request a media effect (e.g., a video effect, a video filter, an audio effect, an audio filter, etc.) to be applied to only one scene of the media file.

While FIG. 1 depicts separate components in system 100, it is to be appreciated that the components may be implemented in a common component. In one example, the instruction component 104, the processing component 106 and/or the finalization component 108 can be included in a single component. Further, it can be appreciated that the design of system 100 can include other component selections, component placements, etc., to facilitate modifying a subsection of uploaded media content.

Figure 2:
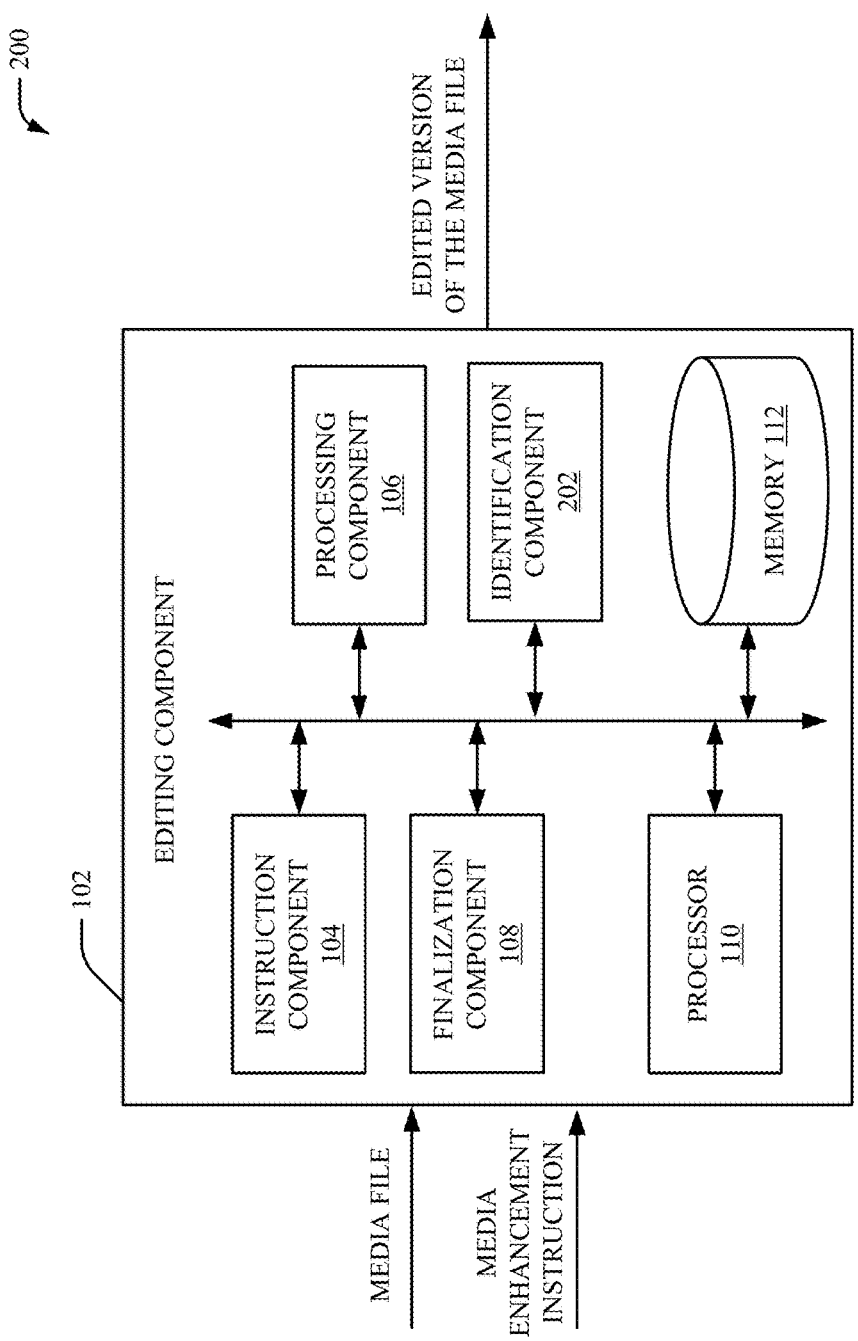
FIG. 2 illustrates a high-level block diagram of another example editing component for modifying a subsection of uploaded media content, in accordance with various aspects and implementations described herein.

Referring to FIG. 2, there is illustrated a non-limiting implementation of a system 200 in accordance with various aspects and implementations of this disclosure. The system 200 includes the editing component 102. The editing component 102 can include the instruction component 104, the processing component 106, the finalization component 108 and/or an identification component 202.

The identification component 202 can identify at least one media frame of the media file that includes particular content (e.g., a particular type of content). Furthermore, the identification component 202 can provide the at least one media frame of the media file that includes particular content (e.g., at least one identified media frame that includes particular content) to the processing component 106. As such, the processing component can apply one or more media effects to the at least one media frame of the media file that includes particular content (e.g., at least one identified media frame that includes particular content).

In an aspect, a media enhancement instruction can include at least enhancement data and a content identifier (e.g., a reference content identifier, etc.). For example, a content identifier can be associated with the particular content (e.g., a content identifier can be a reference to facilitate identification of the particular content). In one example, the identification component 202 can employ one or more image recognition techniques and/or one or more audio recognition techniques. For example, the identification component 202 can identify at least one media frame of the media file that includes particular image data based on one or more image recognition techniques. In another example, the identification component 202 can identify at least one media frame of the media file that includes particular audio data based on one or more audio recognition techniques. In an aspect, the identification component 202 can employ a content identifier included in a media enhancement instruction to facilitate one or more image recognition techniques and/or one or more audio recognition techniques.

In another aspect, the identification component 202 can determine media interval data based on the at least one media frame of the media file that includes particular content (e.g., at least one identified media frame that includes particular content). For example, the identification component 202 can determine a start time and an end time for a segment of the media file associated with the particular content. In another example, the identification component 202 can determine a first media frame (e.g., a start frame) and a last media frame (e.g., an end frame) for a segment of the media file associated with the particular content.

In yet another aspect, the identification component 202 can determine additional segments of the media file to modify based on the enhancement data and/or the media interval data received in the media enhancement instruction. For example, the identification component 202 can identify at least one other media frame associated with one or more media frames modified by the enhancement data (e.g., one or more media frames related to the media interval data). As such, the identification component 202 can additionally modify the at least one other media frame based on the enhancement data. In yet another aspect, the identification component 202 can generate (e.g., insert, apply, etc.) a particular media effect in response to identifying particular content (e.g., a particular type of content). For example, particular content (e.g., a particular type of content) identified by the identification component 202 can trigger a particular media effect included in a media enhancement instruction.

In a non-limiting example, a media file received by the editing component 102 (e.g., the instruction component 104) can include one or more media frames that show a particular person. Additionally, a media enhancement instruction can be received by the editing component 102 (e.g., the instruction component 104). The media enhancement instruction received by the editing component 102 (e.g., the instruction component 104) can include at least enhancement data (e.g., a face blurring effect, etc.) and a content identifier (e.g., a content identifier corresponding to the particular person). As such, the identification component 202 can identify one or more media frames that include the particular person based at least in part on the content identifier and/or one or more image recognition techniques (e.g., one or more facial recognition techniques). Additionally, the processing component 106 can apply the enhancement data (e.g., the slow motion filter, etc.) to the one or more media frames that include the particular person. Accordingly, the finalization component 108 can generate an edited version of the media file where a face of the particular person is blurred in each scene of the media file.

In another non-limiting example, a media file received by the editing component 102 (e.g., the instruction component 104) can include one or more media frames associated with particular audio. Additionally, a media enhancement instruction can be received by the editing component 102 (e.g., the instruction component 104). The media enhancement instruction received by the editing component 102 (e.g., the instruction component 104) can include at least enhancement data (e.g., an audio filter, etc.) and a content identifier (e.g., a content identifier corresponding to the particular audio). As such, the identification component 202 can identify one or more media frames that include the particular audio based at least in part on the content identifier and/or one or more audio recognition techniques. Additionally, the processing component 106 can apply the enhancement data (e.g., the audio filter, etc.) to the one or more media frames that include the particular audio. Accordingly, the finalization component 108 can generate an edited version of the media file where the particular audio is modified by the audio filter in each scene of the media file.

Figure 3:
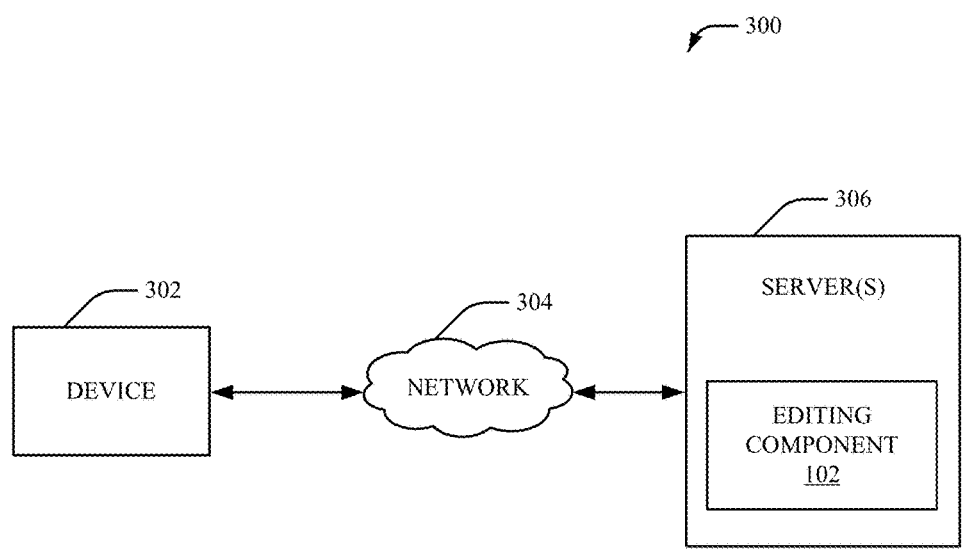
FIG. 3 illustrates a high-level block diagram of an example system for modifying a subsection of uploaded media content, in accordance with various aspects and implementations described herein.

Referring to FIG. 3, there is illustrated a non-limiting implementation of a system 300 in accordance with various aspects and implementations of this disclosure. The system 300 includes a device 302, a network 304 and server(s) 306. The server(s) 306 can include the editing component 102. The editing component 102 can include the instruction component 104, the processing component 106, the finalization component 108 and/or the identification component 202.

The device 302 can be a media capable device and/or a user device. For example, the device 302 can be implemented as, but is not limited to, a mobile device, a handheld device, a cellular phone (e.g., a smartphone), a tablet, an interactive television, an internet-connected television, a set-top box, a streaming media device, a camera, a computer, a laptop computer, a personal digital assistant (PDA), an electronic reader (e-reader), a portable computing device, a gaming device, another type of media capable device, etc. In an aspect, the device 302 can be configured to capture (e.g., record, generate, etc.) media content (e.g., a media file). In another aspect, the device 302 can be configured to obtain (e.g., import) media content (e.g., a media file). Additionally, the device 302 can be configured to generate a media enhancement instruction. For example, one or more media effects (e.g., enhancement data) and/or media interval data can be selected via the device 302. Furthermore, the handheld device 302 can upload media content (e.g., a media file) and/or a media enhancement instruction to the server(s) 306 via the network 304. The editing component 102 can be implemented on the server(s) 306 and/or employed to modify a subsection of uploaded media content, as more fully disclosed herein. In one example, the server(s) 306 can be implemented as media editing server(s) and/or media content server(s). As such, a user can select and/or determine a media enhancement instruction via the device 302 prior to uploading a media file (e.g., a media file to be modified based on the enhancement instruction) to the server(s) 306.

Figure 4:
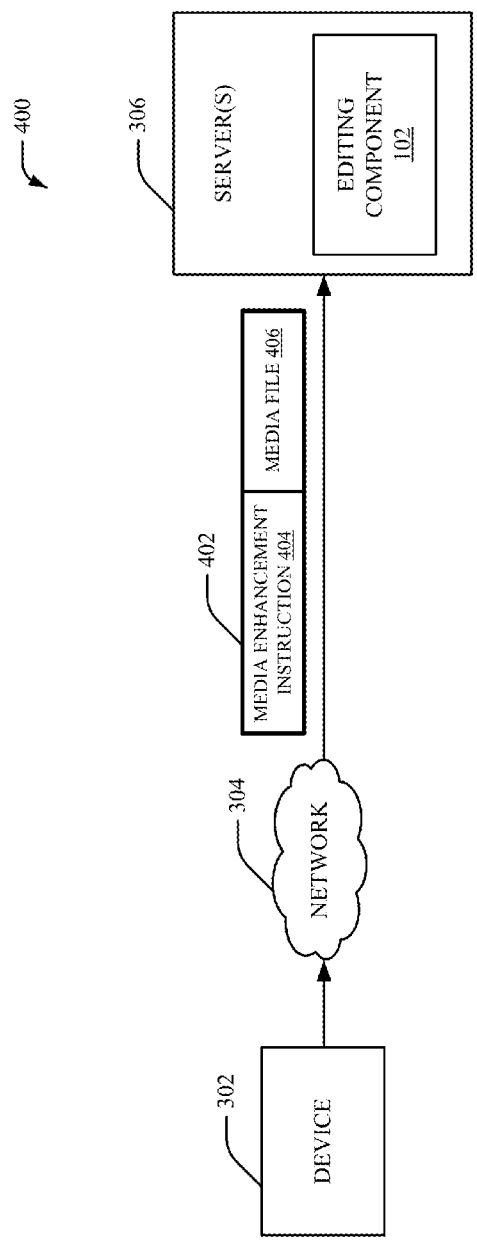
FIG. 4 illustrates an example data transmission, in accordance with various aspects and implementations described herein.

FIG. 4 illustrates a non-limiting implementation of a system 400 in accordance with various aspects and implementations of this disclosure. The system 400 includes the device 302, the network 304 and the server(s) 306. The server(s) 306 can include the editing component 102. The editing component 102 can include the instruction component 104, the processing component 106, the finalization component 108 and/or the identification component 202.

The device 302 can generate a data packet 402 than includes at least a media enhancement instruction 404 and a media file 406. For example, the data packet 402 can be a single payload (e.g., a single data transmission, a single data package, etc.) that includes at least the media enhancement instruction 404 and the media file 406. As such, the media enhancement instruction 404 can be provided to the server(s) 306 (e.g., the editing component 102) along with the media file 406. In an aspect, the media enhancement instruction 404 can be associated with metadata of the data packet 402 (e.g., metadata of the single payload data transmission). For example, the media enhancement instruction 404 can be additional metadata associated with the data packet 402 (e.g., the media file 406). In one embodiment, the media enhancement instruction 404 can be included in the data packet 402 before the media file 406 (e.g., in a header of the data packet 402). In another embodiment, the media enhancement instruction 404 can be included in (e.g., interspersed within media data associated with) the media file 406. In yet another embodiment, the media enhancement instruction 404 can be included in the data packet 402 after the media file 406.

Figure 5:
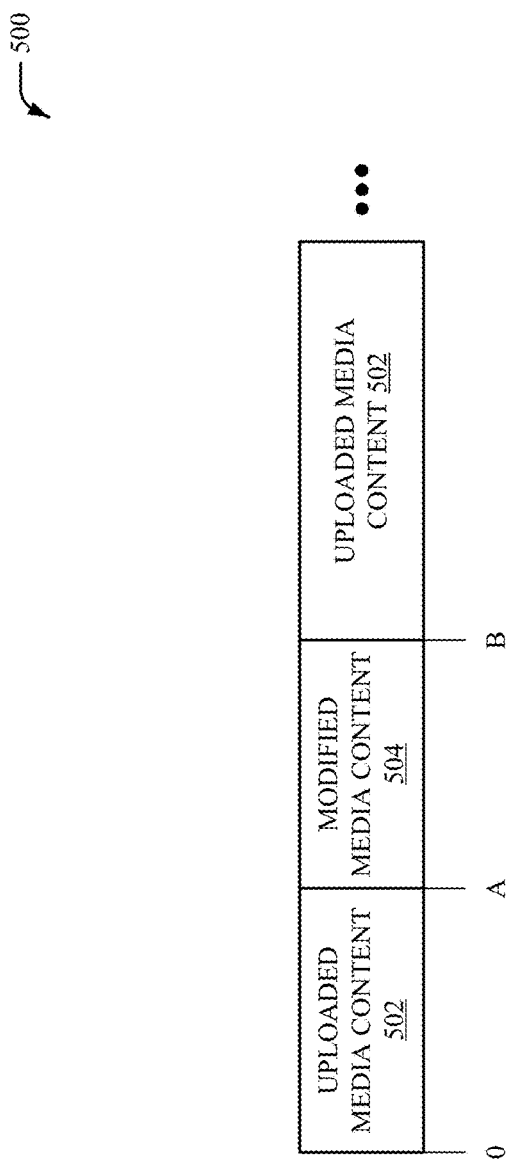
FIG. 5 illustrates an example edited version of a media file, in accordance with various aspects and implementations described herein.

Referring to FIG. 5, there is illustrated a non-limiting implementation of a media file 500 in accordance with various aspects and implementations of this disclosure. In one example, the media file 500 can be an edited version of a media file. For example, the media file 500 can be a media file that is modified and/or generated by the editing component 102 (e.g., the processing component 106 and/or the finalization component 108), as more fully disclosed herein. In a non-limiting example, the media file 500 includes uploaded media content 502 and modified media content 504. For example, the uploaded media content 502 can be an originally uploaded portion of an uploaded media file (e.g., one or more unedited segments of the media file 500). The modified media content 504 can be an edited segment of an uploaded media file (e.g., a segment of an uploaded media file that is modified by one or more media effects).

The modified media content 504 can be a segment of the media file 500 between A and B. In an aspect, the segment of the media file 500 between A and B (e.g., the modified media content 504) can be determined based on a start time and an end time. For example, a start time for the modified media content 504 can be at A (e.g., time A) and an end time for the modified media content 504 can be at B (e.g., time B). In another aspect, the segment of the media file 500 between A and B (e.g., the modified media content 504) can be determined based on a first media frame and a last media frame. A beginning of the modified media content 504 (e.g., a first media frame for the modified media content 504) can be at A (e.g., frame A) and an end of the modified media content 504 (e.g., a last media frame for the modified media content 504) can be at B (e.g., frame B). Each segment of the uploaded media content 502 can be associated with one or more media frames. Furthermore, the modified media content 504 can be associated with one or more media frames. As such, it is to be appreciated that a first media frame of the modified media content 504 can be the same as a last media frame of the modified media content 504 (e.g., frame A can be the same as frame B).

The modified media content 504 can be associated with one or more media enhancements. For example, the modified media content 504 can be uploaded media content that is modified by one or more media enhancements. In an example, the modified media content 504 can be associated with a video effect, a video filter, an audio effect and/or an audio filter. In a non-liming example, the modified media content 504 can be associated with a color enhancement, a lighting enhancement, a stabilization effect, a blurring effect (e.g., a face blurring effect), a slow motion effect, a filter effect, an audio effect and/or another visual effect. However, it is to be appreciated that the modified media content 504 can be associated with a different video effect, a different video filter, a different audio effect and/or a different audio filter. As such, the modified media content 504 can be an edited version of uploaded media content (e.g., media file 406).

In an aspect, the one or more media enhancements can be determined via a media enhancement instruction (e.g., media enhancement instruction 404). For example, a single data package can include the one or more media enhancements associated with the modified media content 504 and an uploaded media file. As such, the uploaded media content 502 can be an unedited portion of an uploaded media file (e.g. media file 406) and the modified media content 504 can be an edited portion of an uploaded media file (e.g., media file 406). It is to be appreciated that the media file 500 is merely an example. The media file 500 can include a different amount of uploaded media content (e.g., a different number of segments associated with unedited media content) and/or a different amount of modified media content (e.g., a different number of segments associated with edited media content). Furthermore, it is to be appreciated that arrangement of uploaded media content (e.g., segments associated with unedited media content) and/or modified media content (e.g., segments associated with edited media content) in the media file 500 can be varied.

Figure 6:
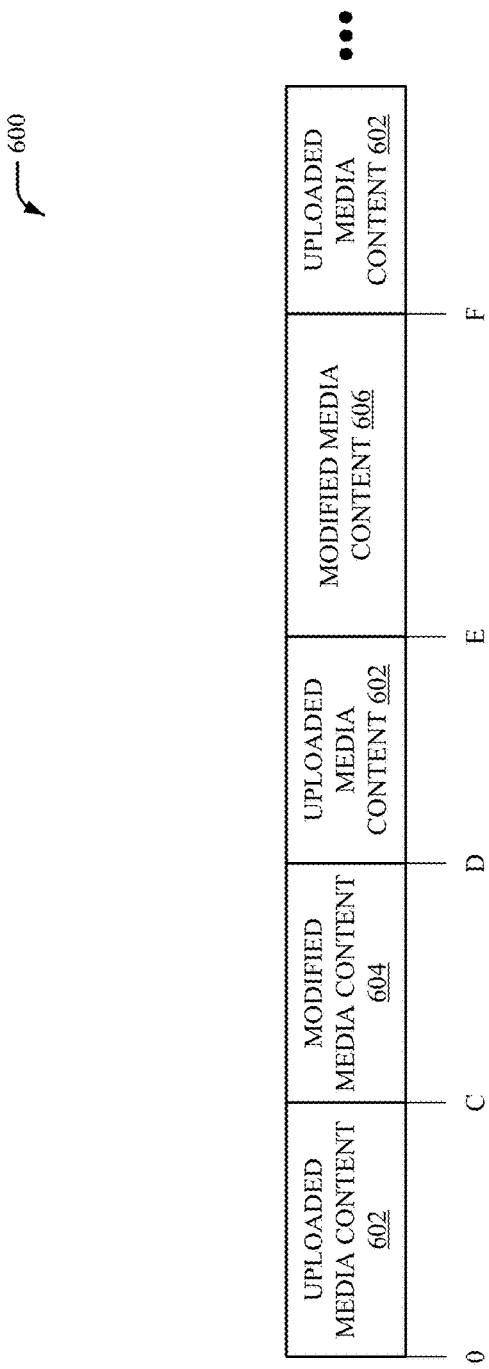
FIG. 6 illustrates another example edited version of a media file, in accordance with various aspects and implementations described herein.

Referring to FIG. 6, there is illustrated a non-limiting implementation of a media file 600 in accordance with various aspects and implementations of this disclosure. In one example, the media file 600 can be an edited version of a media file. For example, the media file 600 can be a media file that is modified and/or generated by the editing component 102 (e.g., the processing component 106 and/or the finalization component 108), as more fully disclosed herein. In a non-limiting example, the media file 600 includes uploaded media content 602, modified media content 604 and modified media content 606. For example, the uploaded media content 602 can be an originally uploaded portion of an uploaded media file (e.g., one or more unedited segments of the media file 600). The modified media content 604 and the modified media content 606 can be edited segments of an uploaded media file.

The modified media content 604 can be a segment of the media file 600 between C and D. In an aspect, the segment of the media file 600 between C and D (e.g., the modified media content 604) can be determined based on a start time and an end time. For example, a start time for the modified media content 604 can be at C (e.g., time C) and an end time for the modified media content 604 can be at D (e.g., time D). In another aspect, the segment of the media file 600 between C and D (e.g., the modified media content 604) can be determined based on a first media frame and a last media frame. For example, a beginning of the modified media content 604 (e.g., a first media frame for the modified media content 604) can be at C (e.g., frame C) and an end of the modified media content 604 (e.g., a last media frame for the modified media content 604) can be at D (e.g., frame D).

Furthermore, the modified media content 606 can be a segment of the media file 600 between E and F. In an aspect, the segment of the media file 600 between E and F (e.g., the modified media content 606) can be determined based on a start time and an end time. For example, a start time for the modified media content 606 can be at E (e.g., time E) and an end time for the modified media content 606 can be at F (e.g., time F). In another aspect, the segment of the media file 600 between E and F (e.g., the modified media content 606) can be determined based on a first media frame and a last media frame. A beginning of the modified media content 606 (e.g., a first media frame for the modified media content 606) can be at E (e.g., frame E) and an end of the modified media content 606 (e.g., a last media frame for the modified media content 606) can be at F (e.g., frame F). Each segment of the uploaded media content 602 can be associated with one or more media frames. Furthermore, the modified media content 604 and/or the modified media content 606 can be associated with one or more media frames. It is to be appreciated that a first media frame of the modified media content 604 can be the same as a last media frame of the modified media content 604 (e.g., frame C can be the same as frame D). It is also to be appreciated that a first media frame of the modified media content 606 can be the same as a last media frame of the modified media content 606 (e.g., frame E can be the same as frame F).

The modified media content 604 can be associated with one or more media enhancements. For example, the modified media content 604 can be uploaded media content that is modified by one or more media enhancements. In an example, the modified media content 604 can be associated with a video effect, a video filter, an audio effect and/or an audio filter. In a non-liming example, the modified media content 604 can be associated with a color enhancement, a lighting enhancement, a stabilization effect, a blurring effect (e.g., a face blurring effect), a slow motion effect, a filter effect, an audio effect and/or another visual effect. However, it is to be appreciated that the modified media content 604 can be associated with a different video effect, a different video filter, a different audio effect and/or a different audio filter.

The modified media content 604 can be an edited version of uploaded media content (e.g., media file 406). In one example, the modified media content 606 can be associated with the one or more media enhancements associated with the modified media content 604. In another example, the modified media content 606 can be associated with one or more other media enhancements that are not associated with the modified media content 604. Therefore, in one example, the modified media content 606 can be associated with a different video effect, a different video filter, a different audio effect and/or a different audio filter (e.g., a video effect, a video filter, an audio effect and/or an audio filter that is not associated with the modified media content 604).

In an aspect, the one or more media enhancements for the modified media content 604 and/or the modified media content 606 can be determined via a media enhancement instruction (e.g., media enhancement instruction 404). For example, a single data package can include one or more media enhancements associated with the modified media content 604 and/or one or more media enhancements associated with the modified media content 606, as well as an uploaded media file. The uploaded media content 602 can be an unedited portion of an uploaded media file (e.g. media file 406). Furthermore, the modified media content 604 and the modified media content 606 can each be an edited portion of an uploaded media file (e.g., media file 406).

It is to be appreciated that the media file 600 is merely an example. As such, it is to be appreciated that the media file 600 can include a different amount of uploaded media content (e.g., a different number of segments associated with unedited media content) and/or a different amount of modified media content (e.g., a different number of segments associated with edited media content). Furthermore, it is to be appreciated that arrangement of uploaded media content (e.g., segments associated with unedited media content) and/or modified media content (e.g., segments associated with edited media content) in the media file 600 can be varied.

Figure 7:
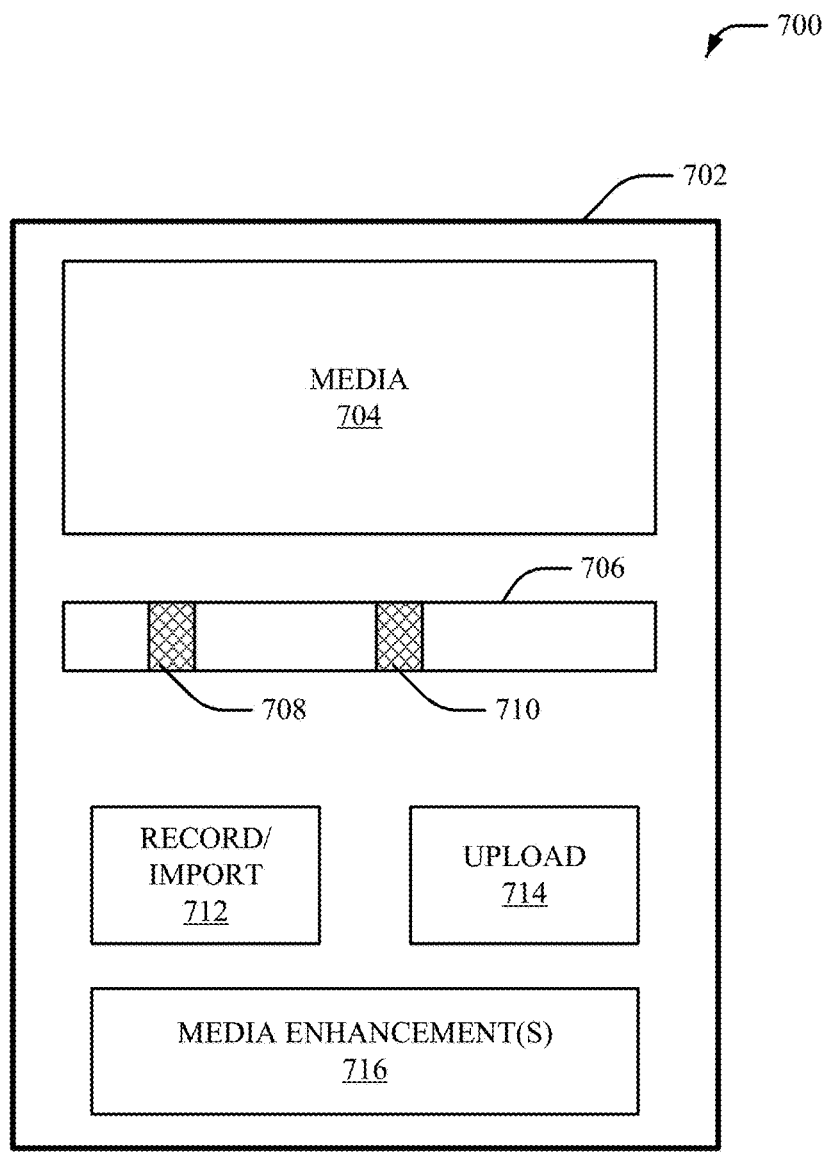
FIG. 7 illustrates an example user interface, in accordance with various aspects and implementations described herein.

FIG. 7 illustrates a non-limiting implementation of a system 700, in accordance with various aspects and implementations of this disclosure. The system 700 depicts an example user interface (e.g., a graphical user interface) 702. The system 700 can be implemented in connection with a device (e.g., the device 302). Furthermore, the system 700 can be implemented in connection with the editing component 102 (e.g., the instruction component 104, the processing component 106, the finalization component 108 and/or the identification component 202). For example, the user interface 702 can be implemented on and/or accessed via a device (e.g., the device 302). In an example, the user interface 702 can be implemented on and/or accessed via a mobile device, a handheld device, a cellular phone (e.g., a smartphone), a tablet, an interactive television, an internet-connected television, a set-top box, a streaming media device, a camera, a computer, a laptop computer, a personal digital assistant (PDA), an electronic reader (e-reader), a portable computing device, a gaming device, another type of media capable device, etc. In an aspect, the user interface 702 can be utilized in connection with a media capture application (e.g., a video capture application, etc.) and/or a media editor application (e.g., a video editor application, etc.).

The user interface 702 can facilitate at least presenting and/or editing media content (e.g., video content and/or audio content). For example, the user interface 702 can facilitate determining one or more media enhancements for media 704 and/or media interval data associated with the media 704. The user interface 702 can include at least a media enhancement(s) option 716 for the media 704. For example, media enhancement(s) option 716 can be utilized to select one or more media enhancement for one or more portions (e.g., one or more segments, one or more subsections, etc.) of the media 704, as more fully disclosed herein. A media enhancement associated with the media enhancement(s) option 716 can be a video effect, a video filter, an audio effect and/or an audio filter. A media enhancement associated with the media enhancement(s) option 716 can include, but is not limited to, a color enhancement, a lighting enhancement, a stabilization effect, a blurring effect (e.g., a face blurring effect), a slow motion effect, a filter effect, an audio effect, another visual effect, etc. However, it is to be appreciated that a media enhancement associated with the media enhancement(s) option 716 can include a different video effect, a different video filter, a different audio effect and/or a different audio filter. In an aspect, a user can select one or more media enhancements from the media enhancement(s) option 716 by manually selecting the one or more media enhancements (e.g., from a list and/or group of media enhancements). In another aspect, a user can select one or more media enhancements from the media enhancement(s) option 716 via a voice command.

In an aspect, a portion of the media 704 can be selected (e.g., one or more media enhancement for one or more portions of the media 704) by employing a timeline 706. For example, the timeline 706 can be associated with one or more media frames related to the media 704 and/or a time interval related to the media 704. In one example, the timeline 706 can be a scrollable timeline. For example, a slider 708 and a slider 710 can be employed to select a media interval (e.g., a segment of the media 704) to be modified by one or more media enhancements. As such, a user can mark a start and an end (e.g., identifiers) corresponding to a portion of the media 704 (e.g., a portion of the media 704 to be modified by one or more media enhancements) via the timeline 706. In another aspect, a user can input a start value and an end value (e.g., a start time and an end time, a first frame and a last frame, etc.) to select a portion of the media 704 (e.g., a portion of the media 704 to be modified by one or more media enhancements) via the user interface 702.

In an implementation, the user interface 702 can include a record/import option 712 and/or an upload option 714. For example, a user can record (e.g., generate, capture, etc.) the media 704 and/or import the media 704 via the record/import option 712. In another example, a user can upload media 704 and/or a media enhancement instruction (e.g., enhancement data selected via the media enhancement(s) option 716 and/or and media interval data selected via the slider 708 and the slider 710, etc.) to at least one server (e.g., the server(s) 306) via the upload option 714. It is to be appreciated that the user interface 702 is merely an example. As such, the user interface 702 can include other features, content and/or functionalities not shown in FIG. 7.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 8:
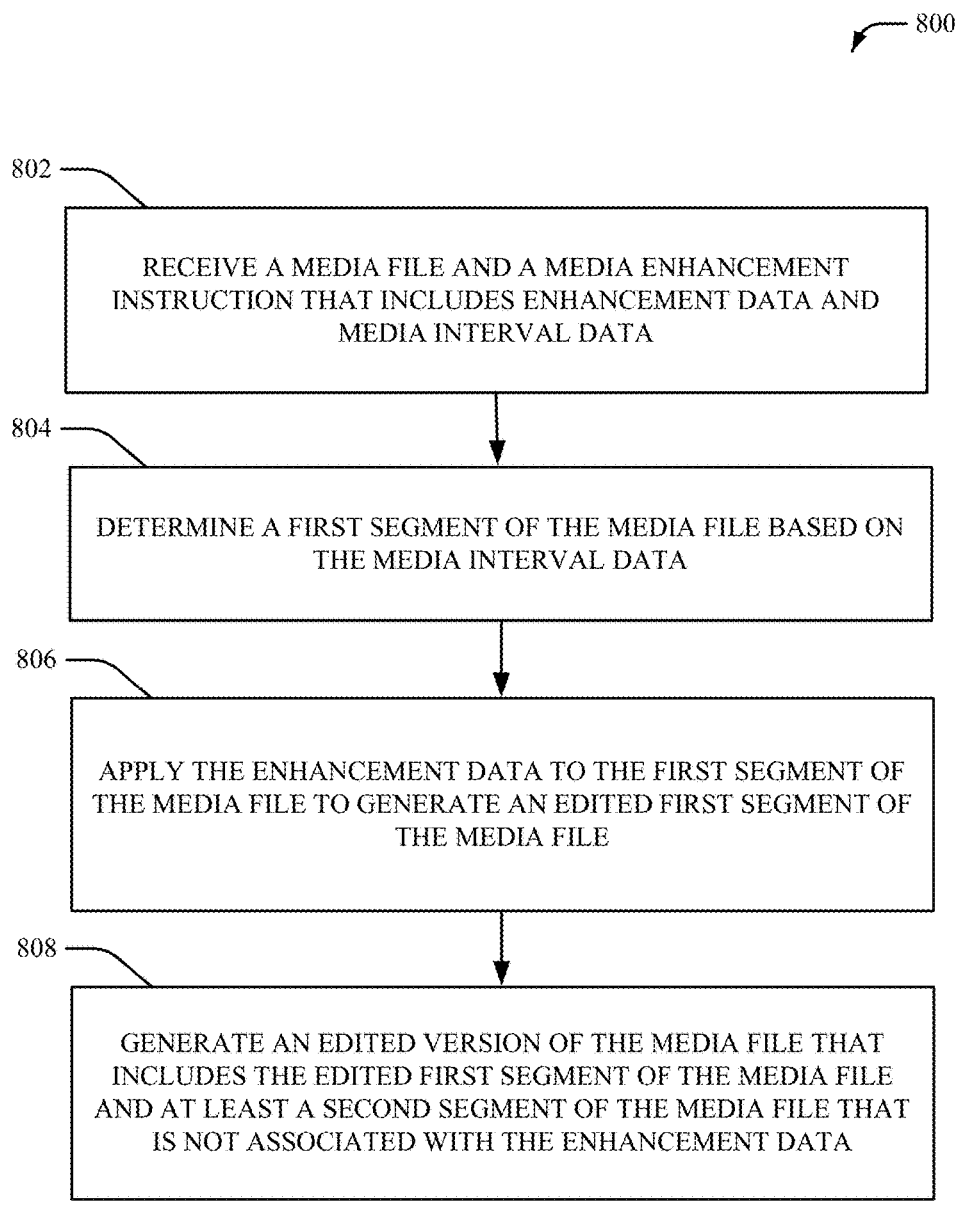
FIG. 8 depicts a flow diagram of an example method for modifying a subsection of uploaded media, in accordance with various aspects and implementations described herein.

Referring to FIG. 8, there illustrated is a methodology 800 for modifying a subsection of uploaded media, according to an aspect of the subject innovation. As an example, methodology 800 can be utilized in various applications, such as, but not limited to, media editing systems, media content systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, etc.

At 802, a media file and a media enhancement instruction that includes enhancement data and media interval data is received (e.g., by an instruction component 104). In an aspect, the media file and the media enhancement data can be included in a single payload (e.g., a single data transmission). Enhancement data can include a video effect, a video filter, an audio effect and/or an audio filter. Media interval data can include time values associated with the media file and/or identifiers for media frames of the media file.

At 804, a first segment of the media file is determined (e.g., by a processing component 106) based on the media interval data. For example, one or more media frames of the media file can be determined based on the media interval data.

At 806, the enhancement data is applied to the first segment of the media file (e.g., by a processing component 106) to generate an edited first segment of the media file. For example, the first segment of the media file can be modified (e.g., edited) based on the enhancement data.

At 808, an edited version of the media file that includes the edited first segment of the media file and at least a second segment of the media file that is not associated with the enhancement data is generated (e.g., by a finalization component 108). For example, a modified version of the media file that includes the edited first segment of the media file and at least a second segment of the media file that is not modified by the enhancement data can be generated.

Figure 9:
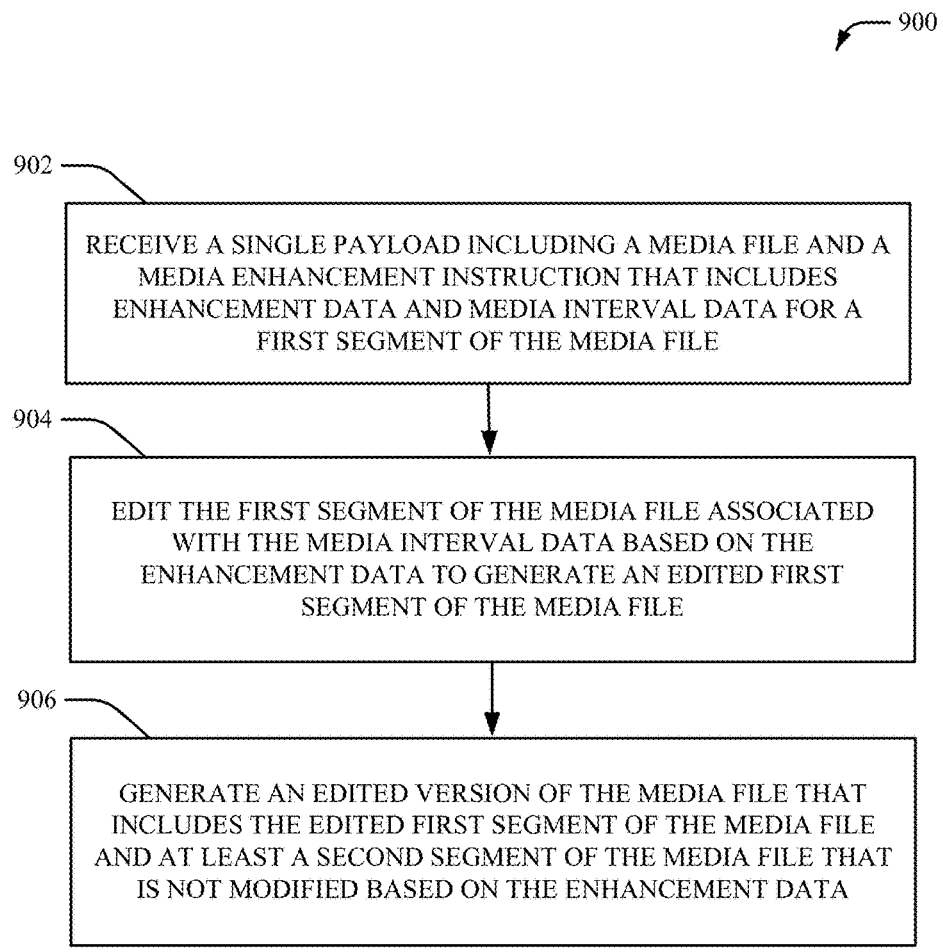
FIG. 9 depicts a flow diagram of another example method for modifying a subsection of uploaded media, in accordance with various aspects and implementations described herein.

Referring to FIG. 9, there illustrated is an example methodology 900 for modifying a subsection of uploaded media, according to another aspect of the subject innovation. At 902, a single payload including a media file and a media enhancement instruction that includes enhancement data and media interval data for a first segment of the media file is received (e.g., by an instruction component 104). For example, enhancement data can include a video effect, a video filter, an audio effect and/or an audio filter. In an aspect, the media interval data can be a start time and an end time for the first segment of the media file. In another aspect, the media interval data can be a first media frame (e.g., a start frame) and a last media frame (e.g., an end frame) for the first segment of the media file.

At 904, the first segment of the media file associated with the media interval data is edited (e.g., by a processing component 106) based on the enhancement data to generate an edited first segment of the media file. For example, the enhancement data can be applied to the first segment of the media file that is associated with the media interval data.

At 906, an edited version of the media file that includes the edited first segment of the media file and at least a second segment of the media file that is not modified based on the enhancement data is generated (e.g., by a finalization component 108). For example, at least another segment of the edited version of the media file can correspond to unedited media content that is originally included in the single payload.

Figure 10:
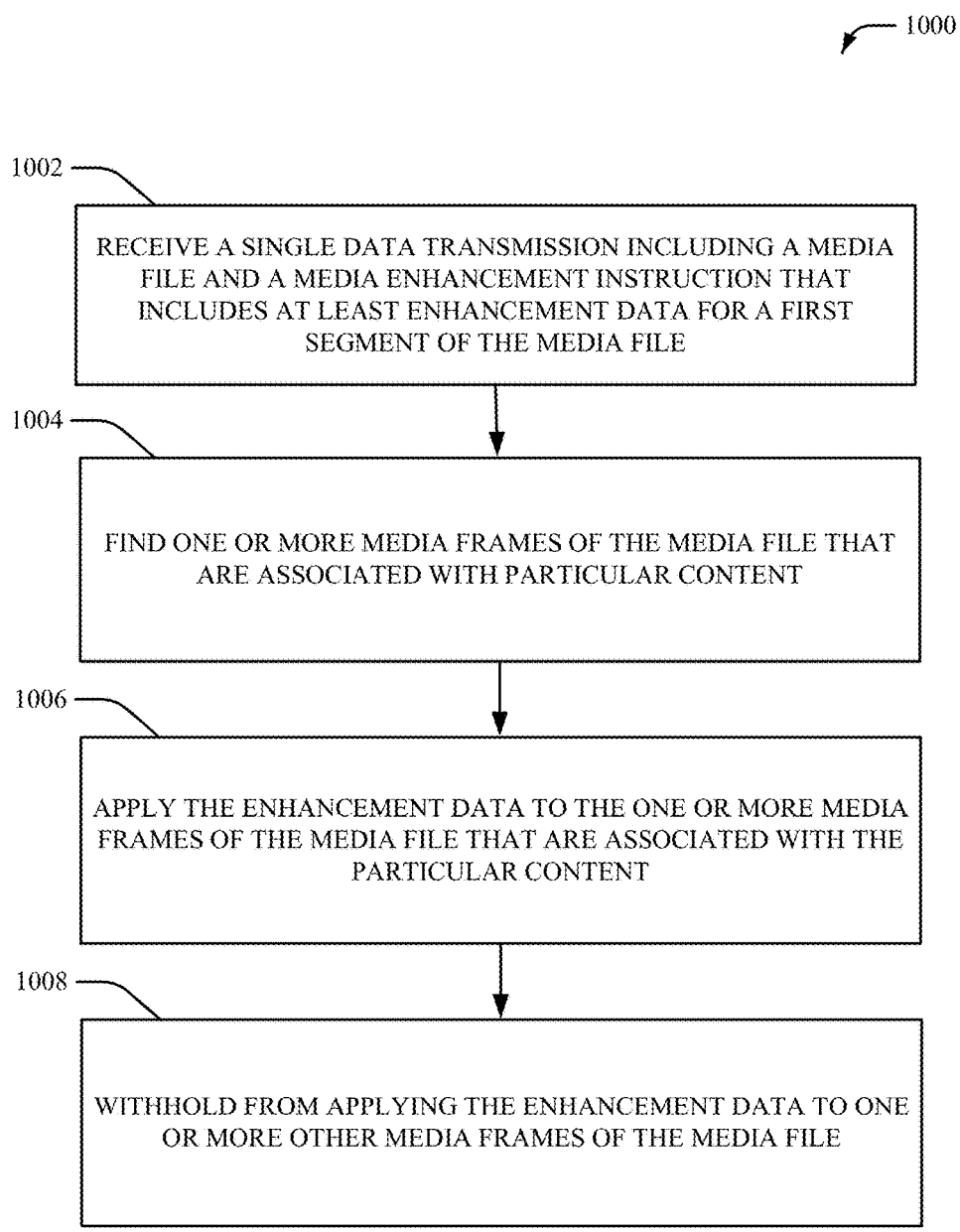
FIG. 10 depicts a flow diagram of yet another example method for modifying a subsection of uploaded media, in accordance with various aspects and implementations described herein.

Referring to FIG. 10, there illustrated is an example methodology 1000 for modifying of a subsection of media, according to yet another aspect of the subject innovation. At 1002, a single data transmission including a media file and a media enhancement instruction that includes at least enhancement data for a first segment of the media file is received (e.g., by an instruction component 104). Enhancement data can include a video effect, a video filter, an audio effect and/or an audio filter.

At 1004, one or more media frames of the media file that are associated with particular content are found (e.g., by an identification component 202). For example, one or more image recognition techniques and/or one or more audio recognition techniques can be employed to identify the one or more media frames of the media file associated with the particular content. In one example, one or more media frames of the media file that include particular image data can be identified based on one or more image recognition techniques. In another example, one or more media frames of the media file that include particular audio data can be identified based on one or more audio recognition techniques. In an aspect, the single data transmission can additionally include a content identifier (e.g., a reference content identifier) associated with the particular content. As such, one or more media frames of the media file that are associated with particular content are found based on the content identifier.

At 1006, the enhancement data is applied to the one or more media frames of the media file that are associated with the particular content (e.g., by a processing component 106). For example, the one or more media frames of the media file that are associated with the particular content can be modified based on the enhancement data.

At 1008, the enhancement data is not applied to one or more other media frames of the media file (e.g., by a processing component 106). For example, one or more other media frames of the media file can be associated with unedited media content (e.g., uploaded media content of the media file) included in the single data transmission.

Figure 11:
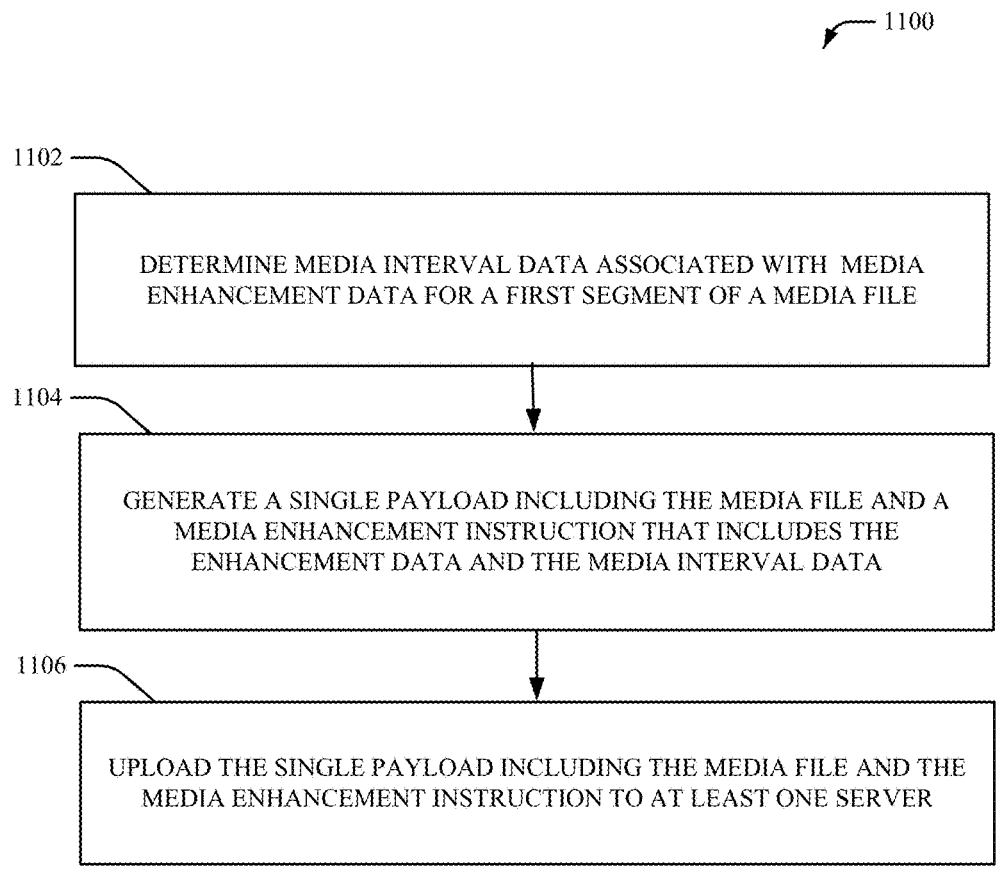
FIG. 11 depicts a flow diagram of an example method for facilitating modification of a subsection of a media file, in accordance with various aspects and implementations described herein.

Referring to FIG. 11, there illustrated is an example methodology 1100 for facilitating modification of a subsection of media, according to an aspect of the subject innovation. At 1102, a media interval data associated with media enhancement data is determined (e.g., via a device 302, via a user interface 702, etc.) for a first segment of a media file. For example, a start time and an end time for a first segment of a media file can be determined. In another example, a first media frame (e.g., a start frame) and a last media frame (e.g., an end frame) for a first segment of a media file can be determined. In an aspect, the media enhancement data and/or the first segment of the media file can be selected and/or determined by a user (e.g., via a mobile device, etc.)

At 1104, a single payload including the media file and a media enhancement instruction that includes the enhancement data and the media interval data is generated (e.g., via a device 302, via a user interface 702, etc.). For example, a single data transmission that includes the media file and a media enhancement instruction can be generated. In an aspect, the media enhancement instruction can be included in a header of the single payload (e.g., a header of the single data transmission).

At 1106, the single payload including the media file and the media enhancement instruction is uploaded to at least one server (e.g., via a device 302, via a user interface 702, etc.). For example, the single payload can be transmitted to at least one server that can modify the media file based on the enhancement instruction.

Figure 12:
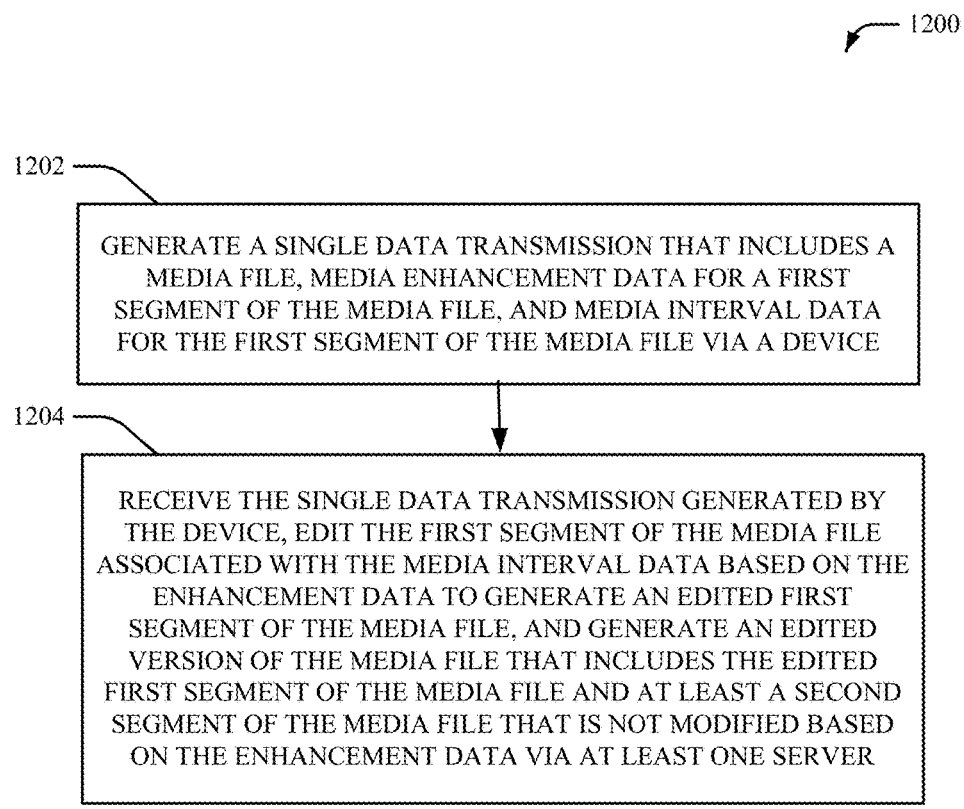
FIG. 12 depicts a flow diagram of an example method for applying one or more media enhancements to a specific portion of a media file, in accordance with various aspects and implementations described herein.

Referring to FIG. 12, there illustrated is an example methodology 1200 for applying one or more media enhancements to a specific portion of a media file, according to an aspect of the subject innovation. At 1202, a single data transmission that includes a media file, media enhancement data for a first segment of the media file, and media interval data for the first segment of the media file is generated via a device (e.g., via a device 302). For example, the media enhancement data and/or the media interval data for the first segment of the media file can be generated based on an action associated with a user employing the device. In an aspect, the device can be a media capable device and/or a user device. For example, the device can be implemented as, but is not limited to, a mobile device, a handheld device, a cellular phone (e.g., a smartphone), a tablet, an interactive television, an internet-connected television, a set-top box, a streaming media device, a camera, a computer, a laptop computer, a personal digital assistant (PDA), an electronic reader (e-reader), a portable computing device, a gaming device, another type of media capable device, etc.

At 1204, the single data transmission generated by the device is received via at least one server (e.g., via server(s) 306). Additionally, the first segment of the media file associated with the media interval data is edited based on the enhancement data to generate an edited first segment of the media file via at least one server (e.g., via server(s) 306). Additionally, an edited version of the media file that includes the edited first segment of the media file and at least a second segment of the media file that is not modified based on the enhancement data is generated via at least one server (e.g., via server(s) 306). For example, the at least one server can apply enhancement data included in the single data transmission to the first segment of the media file that is also included in the single data transmission (e.g., to generate the edited version of the media file).

Figure 13:
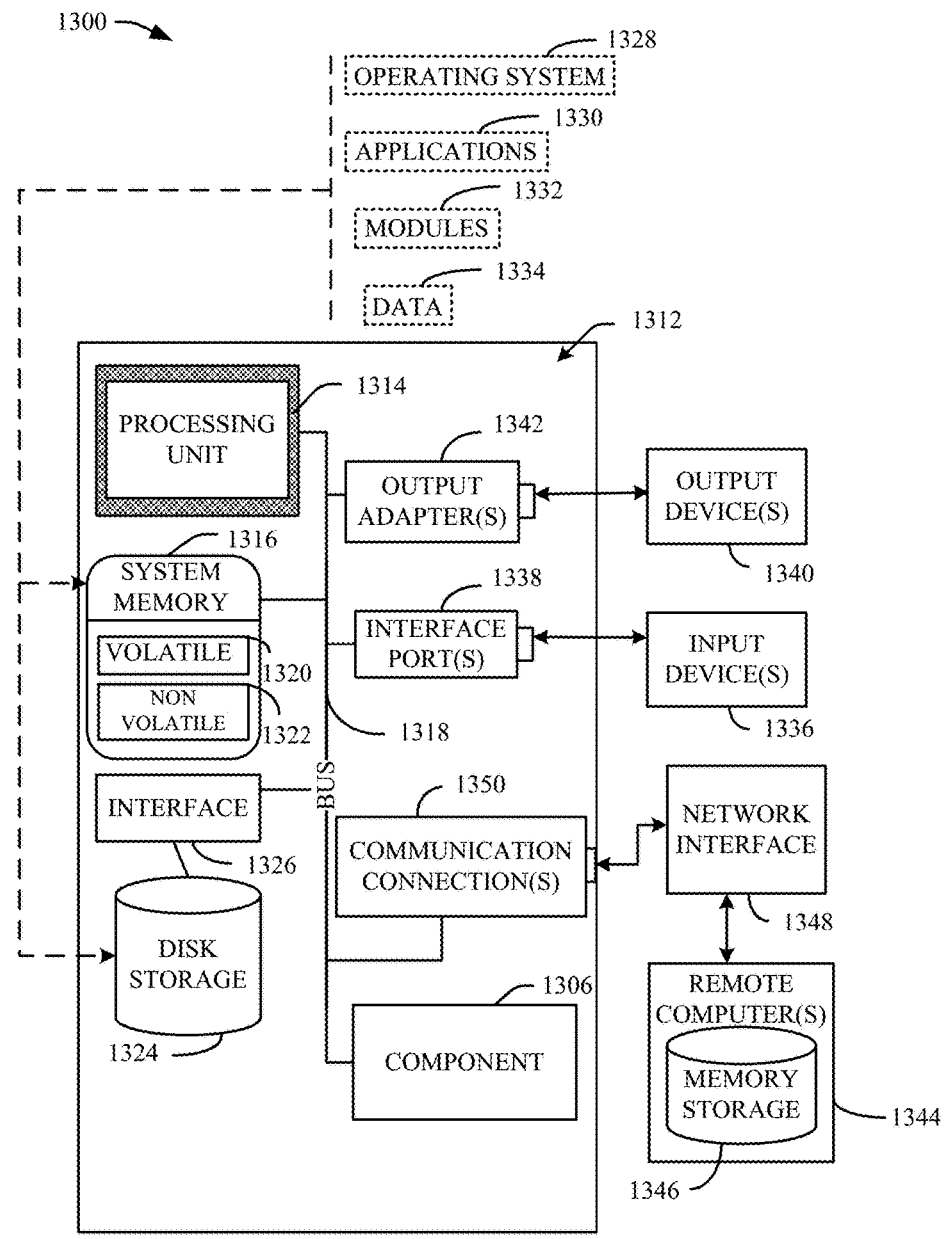
FIG. 13 is a schematic block diagram illustrating a suitable operating environment.
Figure 14:
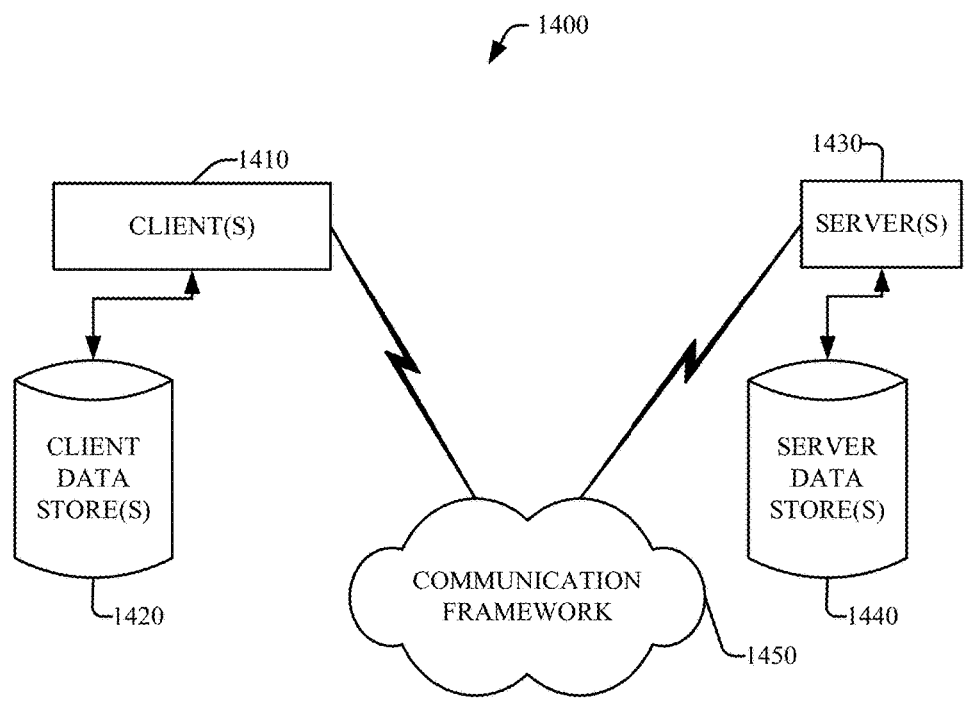
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, a suitable environment 1300 for implementing various aspects of this disclosure includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 also includes removable/non-removable, volatile/nonvolatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

FIG. 13 also depicts software that acts as an intermediary between users and the basic computer resources described in the suitable operating environment 1300. Such software includes, for example, an operating system 1328. Operating system 1328, which can be stored on disk storage 1324, acts to control and allocate resources of the computer system 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

It is to be appreciated that the computer 1312 can be used in connection with implementing one or more of the systems or components shown and described in connection with FIGS. 1-7. In accordance with various aspects and implementations, the computer 1312 can be used to facilitate modifying a subsection of uploaded media. In certain exemplary embodiments, the computer 1312 includes a component 1306 (e.g., the editing component 102) that can contain, for example, an instruction component, a processing component, a finalization component and/or an identification component, each of which can respectively function as more fully disclosed herein.

FIG. 14 is a schematic block diagram of a sample-computing environment 1400 with which the subject matter of this disclosure can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing this disclosure, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1420 that can be employed to store information local to the client(s) 1410. Similarly, the server(s) 1430 are operatively connected to one or more server data store(s) 1440 that can be employed to store information local to the servers 1430.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., editing component, instruction component, processing component, finalization component, identification component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a memory; and
 a processor that, when executing computer-executable instructions stored in the memory, is configured to:
  receive a media file and a media enhancement instruction that includes enhancement data for a first segment of the media file and a content identifier associated with particular content included in the first segment of the media file, wherein the enhancement data indicates a visual effect to be applied to the first segment of the media file;
  determine media interval data based on at least one frame of the first segment of the media file that includes the particular content associated with the content identifier;

modify the first segment of the media file associated with the media interval data based on the visual effect indicated by the enhancement data to generate an edited first segment of the media file; and generate an edited version of the media file that includes the edited first segment of the media file and at least a second segment of the media file that is not modified based on the enhancement data.

2. The system of claim 1, wherein the processor is further configured to receive a single data packet that includes the media file and the media enhancement instruction.

3. The system of claim 1, wherein the media interval data specifies an identifier for a first media frame and a last media frame of the first segment.

4. The system of claim 1, wherein the media interval data specifies a start time and an end time for the first segment.

5. The system of claim 1, wherein the media enhancement instruction is received from a mobile device.

6. The system of claim 1, wherein the processor is further configured to modify a third segment of the media file based on the enhancement data to generate an edited third segment, and wherein the edited version of the media file further includes the edited third segment of the media file.

7. The system of claim 1, wherein the processor is further configured to modify a third segment of the media file based on second enhancement data corresponding to the third segment of the media file to generate an edited third segment, and wherein the edited version of the media file further includes the edited third segment of the media file.

8. A method, comprising:
employing a processor that facilitates execution of computer executable instructions stored on a non-transitory computer readable medium to implement operations, comprising:
receiving a single payload including a media file and a media enhancement request that includes enhancement data for a first segment of the media file and a content identifier associated with particular content included in the first segment of the media file, wherein the enhancement data indicates a visual effect to be applied to the first segment of the media file;
determining media interval data based on at least one frame of the first segment of the media file that includes the particular content associated with the content identifier;
editing the first segment of the media file associated with the media interval data based on the visual effect indicated by the enhancement data to generate an edited first segment of the media file; and
generating an edited version of the media file that includes the edited first segment of the media file and at least a second segment of the media file that is not modified based on the enhancement data.

9. The method of claim 8, wherein the modifying further comprises modifying a third segment of the media file based on the enhancement data to generate an edited third segment.

10. The method of claim 9, wherein the generating further comprises generating the edited version of the media file that includes the edited first segment of the media file, the second segment of the media file that is not modified based on the enhancement data, and the edited third segment of the media file.

11. The method of claim 8, wherein the modifying further comprises modifying a third segment of the media file based on second enhancement data corresponding to the third segment of the media file to generate an edited third segment.

12. The method of claim 11, wherein the generating further comprises generating the edited version of the media file that includes the edited first segment of the media file, the second segment of the media file that is not modified based on the enhancement data, and the edited third segment of the media file.

13. The method of claim 8, wherein the receiving comprises receiving the single payload including the media file and the media enhancement request from a mobile device.

14. The method of claim 8, wherein the receiving comprises receiving an identifier for a first media frame and a last media frame of the first segment.

15. The method of claim 8, wherein the receiving comprises receiving a start time and an end time for the first segment.

16. A system, comprising:
a device that generates a single data transmission that includes a media file, enhancement data for a first segment of the media file, and a content identifier associated with particular content included in the first segment of the media file, wherein the enhancement data indicates a visual effect to be applied to the first segment of the media file; and
at least one server that receives the single data transmission generated by the device, determines media interval data based on at least one frame of the first segment of the media file that includes the particular content associated with the content identifier, edits the first segment of the media file associated with the media interval data based on the visual effect indicated by the enhancement data to generate an edited first segment of the media file, and generates an edited version of the media file that includes the edited first segment of the media file and at least a second segment of the media file that is not modified based on the enhancement data.

17. The system of claim 16, wherein the at least one server receives an identifier from the device for a first media frame and a last media frame of the first segment.

18. The system of claim 16, wherein the at least one server receives a start time and an end time associated with the first segment from the device.

19. The system of claim 16, wherein the at least one server further modifies a third segment of the media file based on the enhancement data to generate an edited third segment, and wherein the edited version of the media file further includes the edited third segment of the media file.

20. The system of claim 16, wherein the at least one server further modifies a third segment of the media file based on second enhancement data corresponding to the third segment of the media file to generate an edited third segment, and wherein the edited version of the media file further includes the edited third segment of the media file.

* * * * *